UNITED STATES PATENT OFFICE.

CLARK JOHNSTON, OF ROCHESTER, NEW YORK.

IMPROVEMENT IN LUBRICANTS.

Specification forming part of Letters Patent No. 203,839, dated May 21, 1878; application filed January 18, 1878.

*To all whom it may concern:*

Be it known that I, CLARK JOHNSTON, of Rochester, in the county of Monroe and State of New York, have invented certain new and useful Improvements in Lubricating-Oils, of which the following is a specification:

This invention relates to an improved lubricating compound holding graphite or plumbago in suspension.

The eminent mechanical lubricating qualities of the mineral known as "graphite" or "plumbago" have led to the invention of various compounds having in view the suspension of this substance in condition for practical application to the bearings of machinery for the purpose of reducing friction. The main difficulty encountered in the attempt to produce a lubricant of this nature is the tendency to precipitation of the graphite, and the difficulty has not, so far as I am aware, been overcome to a sufficient extent by any hitherto-known compound to render it capable of holding its graphite in perfect suspension under all atmospheric variations of temperature and the heating of bearings.

A lubricant having this quality has long been a great desideratum, and its production is the object of my invention, which, to this end, consists in the combination of powdered graphite with a solid or liquid compound composed of varying proportions of the following substances, viz: Petroleum, crude paraffine-wax extracted from crude petroleum, Japan wax, myrtle-wax, Gambia wax, and an alkali, the proportions being varied accordingly as a solid or liquid lubricant is desired.

The compound resulting from the combination of these ingredients I have found to have the property of holding its powdered graphite or plumbago in perfect suspension at a temterature of 180° Fahrenheit, and when in liquid form to resist congelation at from 30° to 40° lower than the temperature required to solidify the best qualities of winter-strained sperm and No. 1 lard oil.

For the production of my lubricant in liquid form I use substantially the following proportions, viz: Graphite or plumbago, pulverized, three to five ounces; petroleum, 30 to 37 gravity, one gallon; crude paraffine-wax extracted from crude petroleum, one ounce; myrtle-wax, one-half ounce; Japan wax, one ounce; Gambia wax, one-half ounce; bicarbonate of soda or equivalent alkali, one ounce.

For the solid form, capable of use in the same manner as tallow or the various plastic lubricants, the proportions are substantially the following: Graphite or plumbago, pulverized, eight ounces; petroleum, one gallon; crude paraffine-wax extracted from crude petroleum, two ounces; Japan wax, six ounces; myrtle-wax, one-half ounce; Gambia wax, one-half ounce; bicarbonate of soda or equivalent alkali, one ounce.

In the preparation of either the solid or liquid form of my compound I first heat the oil to about 80° Fahrenheit, and then add the alkali, the purpose of which is to "cut" the oil, or resolve the globules thereof into thin flat tissues, well adapted to prevent the sinking or precipitation of the powdered graphite. I then melt together, and add to the oil the crude paraffine-wax, extracted from crude petroleum, Japan wax, myrtle-wax, and Gambia wax, to form a very adhesive unctuous compound, which adheres to the tissues of the oil and holds the powdered graphite, which is subsequently introduced, the especial function of the crude paraffine-wax, extracted from crude petroleum, being to increase the specific gravity of the whole to such an extent as to obviate the tendency of the graphite to sink. When the ingredients have all been added, but a few moments' exposure to the same heat while briskly agitated is sufficient to effect a thorough combination of the whole, which may cool either slowly or rapidly, the resultant product being either liquid or solid, according to the relative proportions of its constituents.

Each of the substances used, except the alkali, is of itself a lubricant, and is of comparatively low cost, and the method of preparation so inexpensive that the low price at which my lubricant can be placed in the market is one of its principal meritorious features; and when to this is joined its great efficiency, on account of the absolute suspension of the graphite and its capacity to resist change under a wide range of temperature, it becomes an article conspicuous for its adaptability to its intended purpose.

I am aware that bees-wax, Japan wax, myrtle-wax, paraffine, petroleum, and plumbago have been used in combination with glycerine and an alkali; and I do not claim, broadly, such a compound, as I use no glycerine nor refined paraffine, but, instead of the latter, a crude paraffine-wax extracted from crude petroleum.

Having now fully described my invention, and explained the constitution and method of preparation thereof, I claim—

The improved lubricant consisting of the combination, with powdered graphite, of a buoyant compound consisting of petroleum, crude paraffine-wax extracted from crude petroleum, Japan wax, myrtle-wax, Gambia wax, and a suitable alkali.

In testimony that I claim the foregoing I have hereunto set my hand in the presence of the subscribing witnesses.

CLARK JOHNSTON.

Witnesses:
 JAMES L. NORRIS,
 JAMES M. WRIGHT, Jr.